United States Patent Office 3,149,979
Patented Sept. 22, 1964

3,149,979
PIE DOUGH AND METHOD FOR
PRODUCING SAME
Ralph M. Bohn, 5515 Long Island Drive NW., Atlanta, Ga.; and Robert Lee Wiseman, 2635 Lake Ridge Circle; and Charles E. Johnson, 314 Woodbine Ave., both of Rome, Ga.
No Drawing. Filed Sept. 13, 1961, Ser. No. 137,739
5 Claims. (Cl. 99—94)

This invention relates to pie dough and is more particularly concerned with a process of producing pie dough and crusts, and a dry pie crust mix utilized therefor.

In the past, the effects of infinitesimal quantities of sodium bisulfite, sulfhydryl compounds and sodium sulfite on gluten in flour have been noted, together with the counter effect or regenerative effect of acetaldehyde on the dough which has been subjected to these chemicals. Such studies have indicated that sodium bisulfite, cysteine hydrochloride, glutathione and sodium sulfite create a very slippery, soft, inelastic, sticky material unsuitable for normal use but which may be restored to tough form by acetaldehyde. In these studies, there was no suggestion of any practical use of these sulfur compounds in the production of pie doughs and the like.

Pie doughs which have heretofore been produced on a commercial scale are extremely difficult to handle, being brittle and relatively inelastic in their raw forms which prevent the shaping of the doughs into intricate configurations. The prior art doughs also have usually been relatively expensive in that the doughs have contained high amounts of shortening.

Contrary to prior art beliefs and practices, we have found that by the addition of a suitable reducing agent, preferably a sulphur dioxide agent or a substance containing a sulfhydryl group, to the normal ingredients of a pie dough in controlled amounts, a very workable elastic dough may be produced. Unexpectedly, the dough with say a small amount of sodium bisulfite may have a drastically reduced quantity of the expensive shortening without appreciable adverse effect. The resulting dough may be shaped into intricate shapes and cooked to form a crust with a superior shelf life and a tenderness which is not characteristic of many inexpensive crusts found in commercial pies and the like. Moreover, sucrose and/or dextrose and/or other sugars may be added to the doughs containing the bisulfite where a sweeter crust is desired. This permits a graham cracker crust to be made from a pliable dough instead of granulated loosely bound layers formed by the prior art tedious method.

Accordingly, it is an object of the present invention to produce a superior pie crust mix which results in a superior dough and a superior pie crust.

Another object of the present invention is to provide a process of producing pie crusts wherein the dough is readily and easily worked and shaped and wherein the resulting crust is relatively crisp, tender and palatable.

Another object of the present invention is to provide a pie crust mix, a dough and a pie crust which is low in shortening and calories, is inexpensive to manufacture, has a long shelf life and is efficient to use.

Another object of the present invention is to provide a superior dry pie crust mix for household use.

Another object of the present invention is to provide a pie crust mix which will produce a pie dough which is relatively elastic and easy to work into intricate shape and a dough which will maintain its shape during cooking either in an oven or in deep fat.

Another object of the present invention is to provide a pie crust mix and dough which contains sugar so as to produce a relatively sweet pie crust and which may be made to resemble a graham cracker crust but without the inelasticity normally associated with graham cracker crusts.

Other objects, features and advantages of the present invention will become apparent from the following description of various embodiments of the present invention.

In the customary manufacture of commercial pie dough, usually 100 pounds of flour is mixed with from 35 to 60 pounds of shortening and about 20 to 30 pounds of water. Some salt and soda may also be added. Two to three percent sugar, while not normally being utilized in pie crusts, has also been added to reduce the browning time of the dough. The customary ingredients of the pie dough are mixed in a cold state for a short period of time so that the materials are not thoroughly commingled, i.e., the dough is undermixed, and then pressed into thin sheets or layers which are shaped to receive filling and the like and then cooked or fried until brown.

Contrary to prior art beliefs and practices, I have found that the admixture to pie dough of very small quantities of a sulphur dioxide agent will improve the workability of the dough. The term "sulfur dioxide agent" includes any carrier or salt of sulfur dioxide such as sodium bisulfite, sulfur dioxide gas, sodium sulfite, sodium thiosulfite and sodium metabisulfite. The sodium may be replaced with its non-toxic cation equivalents, such as potassium, calcium or ammonia. It will also be understood that the sulfur dioxide agent may be a reacting chemical such as hydrogen sulfide, sulfurous acid and other complexes of sulfur which react with the dough to form sulfur dioxide or hydrogen sulfide such as sulfides, hydrosulfites, hyposulfites and the like. As stated above, the reducing agent or sulfur dioxide agent reacts with the gluten of the flour to thereby reduce its binding powers.

In the specific examples hereinafter set forth, we employ sodium bisulfite since it is the least expensive, purest and most easily handled sulfur dioxide agent. If some other sulfur dioxide agent were substituted therefor, it should be used in proportion to the available $SO_2$ present or created in admixture with the pie dough. For example, if the following chemicals are employed as a substitute for 1 part by weight sodium bisulfite, the equivalent amount (based on $SO_2$) should be used, i.e., .62 part sulfur dioxide, 1.22 parts sodium sulfite, 1.49 parts sodium metabisulfite and 2.50 parts sodium thiosulfite. It will be understood by those skilled in the art that the strength in available $SO_2$ varies in the chemicals such as sodium thiosulfite and sodium metabisulfite and that the ph of dough may effect the disassociation and hence the availability of the $SO_2$ in the various reducing agents. This may necessitate adjustments in the amount of $SO_2$ agent employed. From approximately ¼ ounce to approximately 1 ounce of sodium bisulfite per 100 pounds of flour of even cold undermixed pie dough will result in a more workable or pliable dough which when cooked provides a crust which is less tough and more edible. If the mixing time for the standard cold undermixed pie dough is held to a minimum, together with the quantity of water and shortening, as much as say 3 to 4 ounces of sodium bisulfite per 100 pounds of flour may be used with beneficial results. This high bisulfite dough, however, is impractical since the dough quickly becomes unworkable if left standing for a relatively short period of time and because trimmings from the high bisulfite dough have usually been found to be too tender to be re-used. Further, the high bisulfite dough results in a crust which has an "off" flavor.

A suitable cold pie dough may be produced using the ingredients in quantities given in Table I:

TABLE I
Cold Mix

| Ingredients: | Quantity by weight |
|---|---|
| White flour | pounds 100 |
| Shortening (lard) | do 30–60 |
| Salt | do 1½–2 |
| Water | do 15–30 |
| Sodium bisulfite | ounces ½–2 |

The lower amount of shortening is used with very weak flours and where economy is paramount.

In this cold undermixed dough of Table I, we prefer to use ½ ounce to 1 ounce of sodium bisulfite; however, the addition of any amount of sodium bisulfite below about 4 ounces will improve this pie dough. Approximately 1 ounce of sodium bisulfite in the mix will provide sharply improved qualities over the same dough without the bisulfite. Indeed, with 1 ounce of sodium bisulfite in the cold mix of Table I, the resulting pie dough and crust is comparable to a pie dough and crust having ten to twenty percent more shortening and no sodium bisulfite.

In producing a cold mix pie dough according to Table I, the sodium bisulfite is dissolved in a small quantity of water. The flour, salt and shortening are mixed in the dry state, with the water being added slowly until the proper consistency is approached. Then the sodium bisulfite solution is added, and the mixing is continued. If desired, the sodium bisulfite may be dissolved in a large part or all of the water.

According to the present invention, drastic reductions in the amount of shortening may be achieved if a hot mix is produced having the ingredients according to Table II:

TABLE II
Hot Mix

| Ingredients: | Quantity by weight |
|---|---|
| Flour | 100 pounds. |
| Shortening | 15–45 pounds. |
| Sugar | 0–10 pounds. |
| Salt | 1–3 pounds. |
| Soda (sodium bicarbonate) | None to 12 ounces (0–.75 pound). |
| Water | 10–30 pounds. |
| Sodium bisulfite | ½ ounce to 2 ounces (.03–.125 pound). |

The optimum ingredients, however, are found in Table III:

TABLE III
Hot Mix

| Ingredients: | Parts by weight |
|---|---|
| Flour | 100 |
| Shortening (lard) | 30 to 40 |
| Salt | 2 |
| Dextrose (corn sugar) | 1.5 |
| Sucrose (cane sugar) | 8 |
| Soda (sodium bicarbonate) | 0.75 |
| Water | 21 |
| Sodium bisulfite | 0.06 |

In producing the dough according to Tables II and III, the sodium bisulfite is dissolved in 1 part water. The flour, shortening, soda and salt are mixed together dry in a conventional slow speed dough mixer. The sugars, i.e., corn sugar and cane sugar, are combined with 20 parts of water and brought to a boil in a steam jacketed kettle accompanied by sufficient agitation to cause these sugars to dissolve in the water. This sugar solution is then added to the flour, shortening, soda and salt as the mixer is operated at low speed (in low gear). Immediately thereafter, the sodium bisulfite solution is added thereto and the mixing is continued until a smooth, elastic well mixed dough is produced.

With reference to the quantity of sodium bisulfite to be employed, any amount of sodium bisulfite, up to the maximum of about 4 ounces per 100 pounds of flour, as pointed out above, will improve the qualities of the cold pie dough of Table I. With the well mixed hot doughs of Tables II and III, the minimum sodium bisulfite should be approximately ½ ounce per 100 pounds of flour. The maximum amount of sodium bisulfite should not be over about 2½ ounces to 3 ounces, and even with these amounts, the resulting dough is almost too tender to handle unless the water and sugars are reduced substantially. Further, at these high levels of sodium bisulfite, the resulting crust may have a bad or "off" flavor. Thus, the ratio of sodium bisulfite to flour should be from 1.5:10,000 to 2.5:1,000 and preferably from 3:10,000 to 1.5:1,000.

Baking soda has long been used in pie dough to increase tenderness. A small amount of baking soda is desirable in doughs containing sodium bisulfite but not mandatory. From 4 ounces to 12 ounces of sodium bicarbonate per 100 pounds of flour is recommended. More soda, e.g., 16 ounces, can be used; however, the soda in larger quantities than about 12 ounces may cause an "off" flavor in the crust.

In the pie doughs of Tables II and III, from 15 pounds to 45 pounds of shortening per 100 pounds of flour is recommended, although more shortening, e.g., about 50 pounds, could be used with strong flours, in which case less water should be employed so as to maintain the proper liquid flour ratio as the crust cooks.

In the dough of Tables II and III, the sugar can range from nothing to 25 parts per 100 parts of flour, although with the higher amounts, the water must be reduced or the dough cannot be handled successfully. The only place where more than say 10 parts sugar would be desirable is in the graham cracker crust.

The limits of the various ingredients as described above apply equally to a dough in which 20 to 30 parts of the white flour are replaced by whole wheat flour. In such a mixture, if the sugar is less than 10 parts, the resulting crust would probably be called a "whole wheat" crust. If the sugar were increased to say 20 parts to 30 parts, any part of the sugar being in the form of brown sugar or molasses, it would be considered a graham cracker crust. With this quantity of sugar, the shortening must be at least 20 parts to prevent the baked shell (empty crust) from sticking to the pans. Contrary to prior art practices of putting graham cracker flakes around the pan, the graham cracker crust of the present invention is produced for the dough which is shaped as any other pie dough.

It will be understood by those skilled in the art that while a more smooth and even texture may be produced by mixing the ingredients of Tables II and III as a hot mix, i.e., by heating the sugar solution to boiling before mixing, the sugar solution could be cold or at room temperature, if desired. Slightly more water should be used if the ingredients are mixed cold. For large prefilled pies I recommend the use of the cold mixed dough having the ingredients of Tables II and III. On the other hand, the advantages of the hot mix dough recommend this dough for use with fried pies, pie shells and the smaller pies. The desirability of the hot dough for small units is that it is more elastic than the cold dough and therefore permits easier mechanical handling.

A better understanding of the present invention will be had by reference to various examples disclosed in Tables IV and V. Table IV discloses the ingredients for twelve mixes, each mix being divided in the dry state into two samples. One sample from each mix was "undermixed" or was processed to provide a "short mix," while the other sample was thoroughly mixed or commingled to provide a "long mix."

The terms "undermix," "short mix" and "long mix" are well known in the trade and hence require no explanation herein. Suffice it to state that when water is mixed with flour, gluten develops, this gluten being a binder. When a dough is "undermixed" or is a "short mix," the dough is beaten for a time insufficient for the gluten to develop appreciably before the beating operation is discontinued and the dough rolled out or pressed into a suitable layer. When a dough is thoroughly mixed or is a "long mix," the dough is mixed for a sufficient length of time and/or sufficiently vigorously to permit the gluten to develop.

In either event, the $SO_2$ agent of the present invention changes the character of the gluten or modifies the gluten molecule to enhance the dough.

TABLE IV

*Ingredients Employed*

|  | Test pies for soda variations | | | Test pies for lard variations | |
|---|---|---|---|---|---|
|  | Control | 1 | 2 | 3 | 4 |
| Flour, lb | 2 | 2 | 2 | 2 | 2 |
| Shortening, oz | 10 | 10 | 10 | 5 | 20 |
| Salt, g | 18 | 18 | 18 | 18 | 18 |
| Dextrose, g | 10 | 10 | 10 | 10 | 10 |
| Soda, g | 8 | 4 | 16 | 8 | 8 |

MIX WELL, ADD AT BOILING TEMPERATURE WHILE MIXER RUNNING

| Sugar, oz | 2½ }  | ¹10 | ¹10 | ¹10 | ¹10 |
| Water, oz | 7½ } | | | | |

ADD AT ONCE

| $NaHSO_3$, g | 1.1 | 1.1 | 1.1 | 1.1 | 1.1 |
| Water, cc | 7 | 7 | 7 (Dissolved) | 7 | 7 |

|  | Test pies for bisulfite variations | | | | |
|---|---|---|---|---|---|
|  | Control | 5 | 6 | 7 | 8 | 9 |
| Flour, lb | 2 | 2 | 2 | 2 | 2 | 2 |
| Shortening, oz | 10 | 10 | 10 | 10 | 10 | 10 |
| Salt, g | 18 | 18 | 18 | 18 | 18 | 18 |
| Dextrose, g | 10 | 10 | 10 | 10 | 10 | 10 |
| Soda, g | 8 | 8 | 8 | 8 | 8 | 8 |

MIX WELL, ADD AT BOILING TEMPERATURE WHILE MIXER RUNNING

| Sugar, oz | 2½ } | ¹10 | ¹10 | ¹10 | ¹10 | ¹8 |
| Water, oz | 7½ } | | | | | |

ADD AT ONCE

| $NaHSO_3$, g | 1.1 | None | 0.55 | 1.7 | 2.2 | 3.0 |
| Water, cc | 7 | 7 | 7 (Dissolved) | 7 | 7 | 7 |

|  | Test pies for sugar variations | | | |
|---|---|---|---|---|
|  | Control | 10 | 11 | 12 |
| Flour, lb | 2 | 2 | 2 | 2 |
| Shortening, oz | 10 | 10 | 10 | 10 |
| Salt, g | 18 | 18 | 18 | 18 |
| Dextrose, g | 10 | 10 | 10 | 10 |
| Soda, g | 8 | 8 | 8 | 8 |

MIX WELL, ADD AT BOILING TEMPERATURE WHILE MIXER RUNNING

| Sugar, oz | 2½ } | 0 | ²10 | ³10 |
| Water, oz | 7½ } | | | |

ADD AT ONCE

| $NaHSO_3$, g | 1.1 | 1.1 | ---------- | 1.1 |
| Water, cc | 7 | 7 | ---------- | 7 |

¹ Syrup.
² Syrup + 2 oz. sugar.
³ Syrup + 5 oz. sugar.

TABLE V

*Dry Crusts*

[Sample: (from Table IV)]

|  | Short Mix | Long Mix |
|---|---|---|
| Control | Excellent, nice-looking, tender. | Excellent, slightly hard, smooth. |
| 1 | Excellent, nice-looking, tender, rough. | Excellent, smooth, crisp, tender. |
| 2 | Excellent, rough, nice-looking, very tender. | Do. |
| 3 | Excellent, hard, crisp, nice-looking. | Fair, hard, tough, split. |
| 4 | Excellent, too tender to handle. | Too tender to handle. |
| 5 | Rough, cracked in middle, otherwise excellent. | Rough, cracked in middle, otherwise excellent. |
| 6 | Excellent, rough, crisp, tender, nice-looking. | Good, smooth, slightly hard. |
| 7 | Cracked in middle, rough, nice-looking otherwise excellent. | Excellent, cracked in middle, smooth, crisp, tender. |
| 8 | Excellent, tender, slightly rough, nice-looking, crisp. | Fair, cracked in middle, hard. |
| 9 | Excellent, very tender, rough, nice-looking. | Fair, slightly hard, crisp, smooth. |
| 10 | Rough, cracked in middle, otherwise excellent. | Fair to good, hard. |
| 11 | Excellent, rough, very nice-looking. | Excellent crust. |
| 12 | Rough, nice-looking, too tender to handle. | Excellent in all respects. |

It is significant to note that the dry ingredients described above may be mixed in their dry state and packaged for household use, if desired. With such dry mixes, only water in the amount specified need be added, accompanied by sufficient beating to provide the desired dough. By using all white flour and all white sugar, a new and pleasing white dry pie dough mix may be produced.

It is now seen that the various above disclosed ingredients provide pie dough proportions in which a drastic reduction in the amount of shortening normally expected to be used is effected by the mere substitution therefor of sufficient sodium bisulfite to modify the gluten in the flour and thus render the material elastic and workable so that the dough, when mixed, may be flattened or pressed to form a layer of a thickness suitable to provide a pie crust. The presence of the sulfur dioxide agent permits the dough to be more readily shaped into intricate predetermined configurations without the tearing or breaking normally incurred with prior art pie doughs. The shaped dough may be baked alone to form a shell, or it may be filled with fruit, filling, custard, etc., before baking. This dough when subsequently cooked results in a soft and tender crust which is equivalent or superior to the crusts having much higher shortening content and no sodium bisulfite. Moreover, the dough springs (gets thicker) during baking, which permits a thinner dough when rolled. Like prior art crusts, the pie crust of the present invention absorbs moisture; however, with the addition of moisture, our crust does not become appreciably tougher, as would be expected. This characteristic also permits a thinner dough layer to be produced.

The dough produced according to the present invention may be handled more quickly and with less effort than prior art doughs and therefore a far more economical product is made, from both a labor standpoint and an ingredient standpoint.

It will be obvious to those skilled in the art that many variations may be made in the embodiments chosen for the purpose of illustrating the present invention without departing from the scope thereof as defined by the appended claims.

We claim:

1. A process of producing pie dough comprising mixing together 100 parts by weight of flour, from 15 to 50 parts of shortening, up to ¾ part of baking soda, and salt to produce a dry mix, dissolving from 1/32 to 3/16 part sodium bisulfite in water to provide a sodium bisulfite solution, dissolving up to thirty parts of sugar in water to provide a sugar solution, heating said sugar solution to approximately boiling temperature, intermixing the heated sugar solution and the dry mix to produce a dough material, and adding the sodium bisulfite solution to the dough material while continuing the mixing thereof until the admixture thus formed is thoroughly mixed, the water in the admixture being in sufficient quantity to render the same workable.

2. A process of producing a pie crust comprising the steps of mixing flour, shortening and water in pie dough proportions, admixing therewith sufficient sodium bisulfite to provide a sodium bisulfite to flour ratio equivalent to between ¼ ounce to 4 ounces of sodium bisulfite per 100 pounds of flour, pressing the resulting mixture to a thickness suitable to form a pie crust, shaping said resulting mixture to a predetermined configuration, and cooking the pressed shaped resulting mixture.

3. A pie dough of the class containing flour, shortening and water in admixture in pie dough quality and proportions, the combination therewith of a sulphur dioxide agent selected from the group consisting of sodium bisulfite, sodium sulfite, sodium metabisulfite, sodium thiosulfite, sulphur dioxide, potassium bisulfite, potassium sulfite, potassium metabisulfite, potassium thiosulfite, calcium bisulfite, calcium sulfite, calcium metabisulfite, calcium thiosulfite, ammonium bisulfite, ammonium sulfite, ammonium metabisulfite and ammonium thiosulfite, the sulphur dioxide agent being uniformly distributed throughout the pie dough and in an amount sufficient to provide available sulphur dioxide in a quantity equivalent to that provided by from ¼ ounce to 4 ounces of sodium bisulfite to 100 pounds of flour present in the dough, thereby rendering the pie dough more workable, pliable and elastic.

4. A dry pie dough mix comprising a uniform mixture of flour, shortening and sodium bisulfite, the ratio of sodium bisulfite to flour being between ¼ ounce of sodium bisulfite to 100 pounds of flour and 4 ounces of sodium bisulfite to 100 pounds of flour, said flour and shortening being in pie dough proportions such that the mixing therein of water will produce a pie dough capable of being formed into intricate shapes and wherein the pie dough is rendered more workable, pliable and elastic.

5. A process of producing a pie crust comprising the steps of mixing flour, shortening and water in pie dough proportions, admixing therewith a sufficient quantity of a non-toxic sulphur dioxide releasing agent to provide a sulphur dioxide to flour ratio equivalent to between ¼ ounce to 4 ounces of sodium bisulfite per 100 pounds of flour, pressure the resulting mixture to a thickness suitable to form a pie crust, shaping said resulting mixture to a predetermined configuration, and cooking the pressed shaped resulting mixture.

References Cited in the file of this patent

UNITED STATES PATENTS

| | | |
|---|---|---|
| 2,103,443 | Balls et al. | Dec. 28, 1937 |
| 2,280,031 | Weber | Apr. 14, 1942 |
| 2,450,260 | Ward | Sept. 28, 1948 |
| 2,475,368 | Bauer et al. | July 5, 1949 |

FOREIGN PATENTS

| | | |
|---|---|---|
| 510,367 | Great Britain | Aug. 1, 1939 |

OTHER REFERENCES

"Today Woman's Pie Cook Book," 1953, by O'Connor, Ared Publishing Co., Inc. (New York), pp. 18, 19. (Copy in Div. 63).